Patented Apr. 22, 1924.

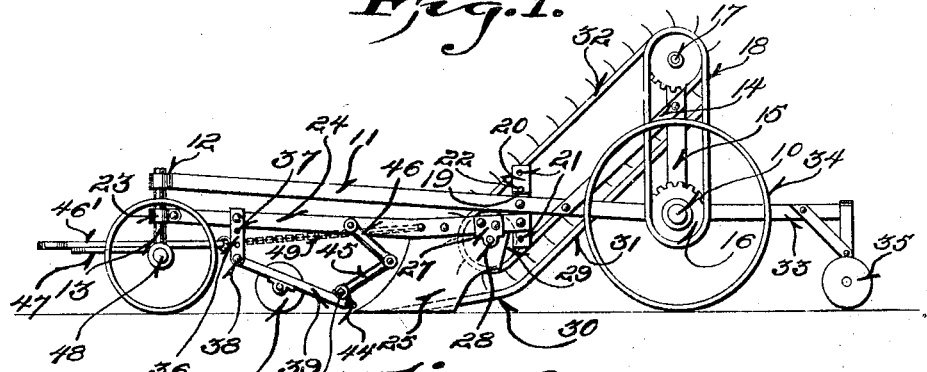

1,491,517

UNITED STATES PATENT OFFICE.

LARS PETER CHRISTENSEN, OF ODENSE, DENMARK.

BEET DIGGER AND TOPPER.

Application filed July 15, 1922. Serial No. 575,431.

*To all whom it may concern:*

Be it known that I, LARS PETER CHRISTENSEN, a citizen of Denmark, and resident of Odense, Denmark, have invented certain new and useful Improvements in Beet Diggers and Toppers; and I do hereby declare that the following is a full, clear, and exact description thereof.

The invention relates to beet toppers and diggers. It comprises a plow, an elevator and a receptacle supported suitably on wheels, the plow being adapted to dig up the beets and position them to be raised by the elevator, and a pivotally supported rocking arm supported wheel running on the ground, carrying a plate rigid with a connecting rod pivoted to a second connecting rod, supported by a frame.

An important feature of the invention is the action of a blade and associated wheel, the wheel adjusting itself to irregularities of the surface of the ground and lifting the blade so that it is at all times presented at a proper height for cutting, the adjusting being automatic and very accurate so that the top is severed at a proper point irrespective of irregularities in the land, and the blade is protected in such a manner as not to come in contact with such obstacles as may be encountered.

A very important object is the combination of the means for varying the height of the blade to correspond with the surface of the ground with devices for maintaining the plane of the blade at a substantially fixed angle with respect to the surface of the ground, so that the edge of the blade is presented at all times for efficient cutting action. There is no angling of the blade with respect to the ground.

The connecting rods affixed to the blade are pivoted to a second connecting rod, and on the movement of the blade upwardly, the rotation of the first mentioned connecting rod and the altering of the angle of inclination thereof with respect to the ground are so negligible that the blade is maintained constantly in a substantially fixed plane with respect to the surface of the ground.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of the present invention constructed according to the best mode I have so far devised for the practical application of the principles thereof, and in which:

Figure 1 is a side elevation of the novel machine.

Figure 2 is a plan thereof.

Figure 3 is a plan of the topping mechanism, and

Figure 4 is a cross section on the line 4—4 of Figure 3.

Rear axle 10 supports longitudinal frame members 11—11', converging forwardly in a collar 12, carried on post 13. Rigid with frame members 11—11', are braces 14 extending upwardly at an incline and secured to supports 15, carried by the rear axle. The rear axle carries a sprocket 16 and a support 15 carries a sprocket 17, a chain 18 connecting the two sprockets.

Transverse frame piece 19 has openings therein, receiving adjusting plates 20, provided with apertures 21, adapted to receive bolts 22 for regulating the height of plates 20 with respect to frame piece 19. Post 13 carries a collar 23, to which are pivoted longitudinal rods 24 rearwardly extending and bolted to plow-sides 25 along the upper edges of the sides which are strengthened in their separated position by brace 26. Rods 24 have lugs 27 secured thereto, in which shaft 28 of pulley 29 is rotatably journalled.

Contacting with the plow-sides 25 adjacent their lower edges, is a bottom 30 extending rearwardly and deflected at 31 to extend upwardly at an incline, so that when the beets are dug from the ground by plow-sides 25, they are received by the elevator 32, traveling on pulley 29 and moved by the sprocket connection with rear axle 10. When the beets reach the highest point of bottom 30, they drop to the ground or are caught in a receptacle adapted to be carried by a trailer, the frame 33 of which is secured to rear axle 10 between rear wheels 34 and supported on wheels 35.

Secured to longitudinal rods 24 is a support 36, having openings 37 therein adapted to receive a pivot 38 for rocking frame 39, to which wheels 40 are secured for rotation, the wheels being carried by arms 41 within frame 39. The ends of the frame have bearings 42 for the reception of the cylindrical ends 43 of blade 44 and a plurality of openings 50, whereby adjustment of the bearings in different positions may be made. The movement of rocking frame 39 on pivot 38 permits the raising and lowering movement of wheels 40 in such wise as to maintain it in contact with the surface of the ground irrespective of irregularities. The raising and lowering of wheels 40 result in a raising and lowering of blade 44, so that the blade is maintained at a proper height for effective cutting action. Again the blade is protected from obstacles as it is lifted above them by the wheel. If blade 44 were rigid with rocking frame 39, the movement of the frame into various positions with respect to the ground would cause a variation of the angle of the blade with respect to the ground, so that the blade would not always be presented at a proper angle.

To an end 43 of the blade, link 45 is rigidly secured, having pivotal connection with link 46 pivoted on longitudinal rod 24. The relationship of the links is such that on slight upward movement of link 45, there is but slight alteration of the inclination of the link with respect to the surface of the ground, and blade 44 being rigid with the link is maintained at a substantially constant inclination with respect to the land, so that the upward movement of wheels 40 does not result in a variation of the angle of the blade 44. The blade is therefore automatically adjusted very accurately, and has a reliable and effective action in removing the beet tops.

The machine is moved over the ground by means of force applied to tongue 46, secured to frame 47 rigid with front axle 48, secured to post 13, the force being exerted thru chains 49 extending rearwardly from the tongue and being secured to plow-sides 25, whereby tension applied to eye 50 of the tongue tensions the chains 49 and applies force directly to the plow.

I claim:

1. In a device of the class described, the combination of wheels, a support carried thereby, a rocking frame pivoted at one end of said support, a wheel carried by said rocking frame, a blade rotatably carried by said rocking frame, a link rigid with said blade, and a second link pivoted at one end to said first mentioned blade and at the other end to said support.

2. In a device of the class described, the combination of wheels, longitudinal members carried thereby, a vertical support secured to said longitudinal members and having apertures therein, a rocking frame, a pivot securing said rocking frame in one of said apertures, a wheel carried for rotation by said rocking frame, a blade mounted for rotation on said rocking frame, a link rigidly secured to said blade, and a second link pivoted to said first mentioned link and to one of said longitudinal members.

In testimony that I claim the foregoing I have hereunto set my hand at Odense, Denmark.

LARS PETER CHRISTENSEN.